July 26, 1966 R. O. GORDON 3,262,523
TRANSMISSION AND VALVE ACTUATED FLUID CLUTCH CONTROL MEANS
Filed June 23, 1964 4 Sheets-Sheet 1

FIG. I

INVENTOR
RICHARD O. GORDON
BY
Kenneth C. Witt
ATTORNEY

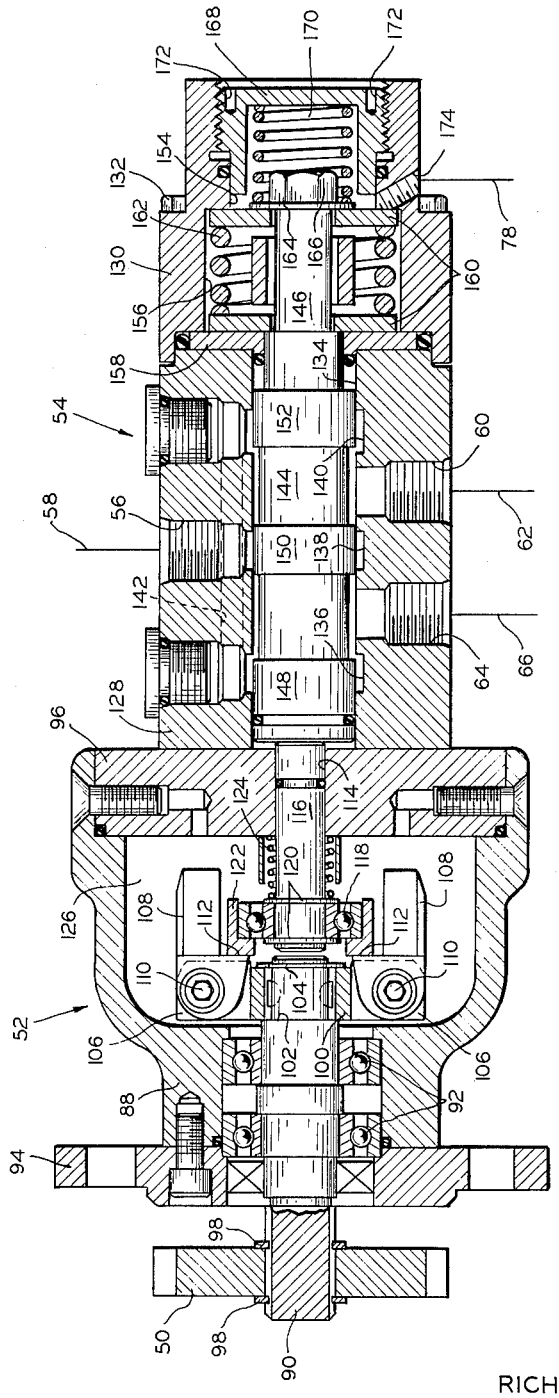

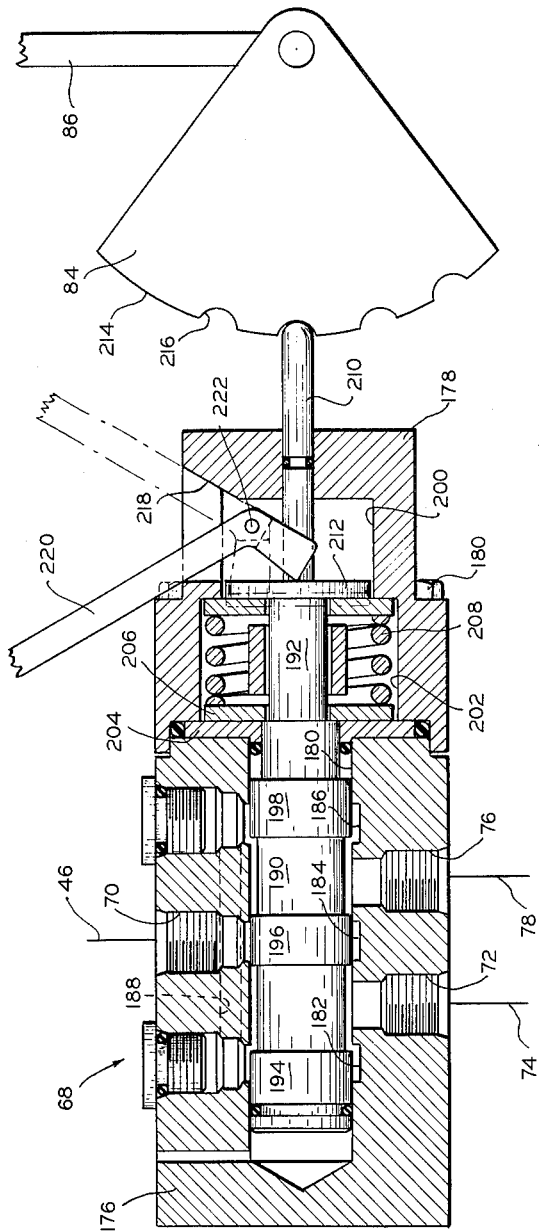

July 26, 1966  R. O. GORDON  3,262,523
TRANSMISSION AND VALVE ACTUATED FLUID CLUTCH CONTROL MEANS
Filed June 23, 1964
4 Sheets-Sheet 4

INVENTOR
RICHARD O. GORDON
BY
Kenneth C. Witt
ATTORNEY

United States Patent Office 3,262,523
Patented July 26, 1966

3,262,523
TRANSMISSION AND VALVE ACTUATED FLUID CLUTCH CONTROL MEANS
Richard O. Gordon, New Buffalo, Mich., assignor to Clark Equipment Company, a corporation of Michigan
Filed June 23, 1964, Ser. No. 377,295
6 Claims. (Cl. 192—3.2)

This invention relates to transmission control systems, and more specifically to a system for controlling the actuation of a lock-up clutch in a hydrodynamic torque converter.

A common power transmission arrangement currently in use includes a hydrodynamic torque converter and a constant mesh gear transmission which is driven by the torque converter. In addition to its torque multiplication qualities, the use of a torque converter with a gear transmission is advantageous because of the inherent shock absorption qualities of the fluid connection between the driving and driven members of the torque converter. This fluid connection serves to absorb the shocks during shifting of the constant mesh gear transmission, thereby greatly reducing wear on the gear transmission.

A hydrodynamic torque converter has a disadvantage in that there is a substantial drop in its efficiency as the relative speed of the driven member approaches that of the driving member. In order to prevent this drop in efficiency of the torque converter as the driven and driving members approach synchronized speed, it is common to provide a lock-up clutch for mechanically coupling the driving and driven members together for conjoint rotation. However, when this is done the torque converter then loses its inherent shock absorption characteristic because there is no longer solely a fluid connection between the driving and driven members.

It is a principal object of the present invention to provide a control system which insures that the lock-up clutch for the torque converter will be disengaged during shifting of the gear transmission.

Another object of my invention is to provide an improved all hydraulic control system.

In carrying out my invention in a preferred embodiment thereof, there is provided a first valve which is operative to connect the lock-up clutch of the torque converter to a source of pressurized fluid or a fluid reservoir. A governor is connected to the first valve and the driven member of the torque converter. The governor is operative to actuate the first valve to connect the lock-up clutch with a source of pressurized fluid when the driven member of the torque converter reaches a predetermined speed. Also connected to the first valve is fluid operated means for overriding the governor and actuating the first valve to connect the lock-up clutch with the reservoir. The overriding means is connected to a second valve which is operative to connect the overriding means with the source of pressurized fluid or the reservoir. The second valve is actuated by means of a cam on the gear transmission shift selector lever which is arranged so that when the gear transmission is shifted the second valve is actuated to connect the overriding means with the source of pressurized fluid. The second valve is provided with mechanical means for maintaining the valve actuated to connect the overriding means with the source of fluid pressure. A modification of the second valve has fluid means for maintaining the second valve actuated to connect the overriding means with the source of pressurized fluid. Finally, an orifice is disposed in the connection between the overriding means and the second valve so that fluid flow from the overriding means to the second valve is restricted, thereby providing a time delay in reengagement of the lock-up clutch.

The above and other objects, features and advantages of my invention will be more readily understood by persons skilled in the art from the following detailed description when taken in conjunction with the accompanying drawing wherein:

FIGURE 1 is a schematic showing of my control system.

FIGURE 2 is a longitudinal section of the governor and the valve connected therewith, FIGURE 3 is a longitudinal section of the valve for controlling the overriding means.

Figure 4:
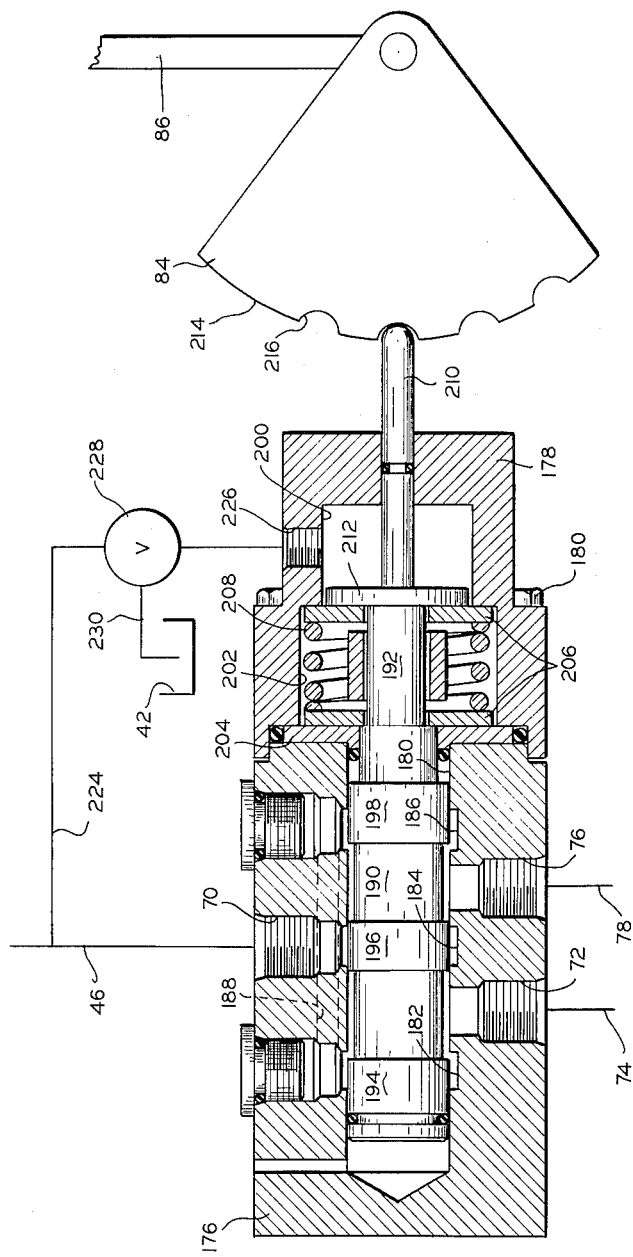
FIGURE 4 is a modification of the valve shown in FIGURE 3 wherein hydraulic means is utilized for maintaining the valve actuated to connect the source of pressurized fluid with the overriding means.

Referring to FIG. 1 of the drawing, the reference numeral 10 denotes generally a hydrodynamic torque converter which is shown schematically. Torque converter 10 includes an impeller or driving member 12 which is connected to a prime mover, not shown, by means of an input shaft 14, a turbine or driven member 16 which is connected to an output shaft 18 and a fixed reaction member 20. Output shaft 18 may be connected to a gear type transmission (not shown). Torque converter 10 also includes a fluid actuated clutch 22 which includes a drum member 24 connected to impeller 12, a hub member 26 connected to turbine member 16, a plurality of friction plates 28 carried by hub member 26 and a plurality of friction plates 30 interleaved with friction plates 28 and carried by drum member 24. Clutch 22 is engaged by supplying pressurized fluid to piston 32 which causes friction plates 28 and 30 to be pressed together with the result that hub 26 and drum 24 are frictionally coupled together. Engagement of clutch 22 serves to connect the driving and driven members of torque converter 10 together for conjoint rotation.

Connected to impeller member 12 by means of a sleeve shaft 34 is a gear 36. Gear 36 meshes with a gear 38 which in turn drives a fluid pump 40 that serves as a source of pressurized fluid for the control system. The pump 40 draws fluid from a fluid reservoir 42 via a conduit 44 and supplies fluid under pressure to a conduit 46.

Connected to output shaft 18 of torque converter 10 is a gear 48 which meshes with a gear 50. Gear 50, in turn, drives a governor 52 which will be described in detail shortly. Governor 52 is connected to a clutch control valve 54 which is operative to connect piston 32 of clutch 22 to pump 40 or reservoir 42. Valve 54 includes an inlet port 56 which is connected to conduit 46 by means of a conduit 58, a return port 60 which is connected to reservoir 42 by means of a conduit 62 and a motor port 64 which is connected to piston 32 by means of a conduit 66. Further details of valve 54 will be explained shortly.

The control system also includes an override control valve 68 which serves to override governor 52 under certain conditions of operation, as will be explained more fully hereinafter. Valve 68 includes an inlet port 70 to which conduit 46 is connected, a return port 72 which communicates with reservoir 42 via conduit 74 and a port 76 which is connected to valve 54 via a conduit 78. Disposed in conduit 78 is an adjustable orifice 80, and bypassing orifice 80 is a one-way check valve 82 which permits fluid flow from port 76 to valve 54 only. Orifice 80 and check valve 82 cooperate to provide a restricted fluid flow from valve 54 to port 76 and a substantially unrestricted fluid flow in a direction toward valve 54 from port 76. Valve 68 is actuated by means of a cam 84 which is connected to a shift selector lever 86 of the constant mesh gear transmission associated with torque converter 10.

Referring now specifically to FIG. 2, a governor 52 includes a housing member 88 within which a shaft 90 is rotatably journaled by ball bearings 92. Connected to housing member is a mounting flange 94 and a back plate 96. The outer end of shaft 90 is splined to receive gear 50 which is held in place thereon by means of snap rings 98. The inner end of shaft 90 has a hub member 100 keyed to it and held against axial movement between a shoulder 102 and a snap ring 104. Hub member 100 includes a pair of radially outwardly extending lugs 106 to which a pair of weights 108 are pivotally connected at 110. Integral with weights 108 are cam portions 112, the function of which will be explained shortly.

An annular opening 114 is located in back plate 96 centrally thereof. A shaft 116 extends through opening 114 and is axially slidable therein. The inner race of a ball bearing 118 is held from axial movement on shaft 116 by means of a pair of snap rings 120 and the outer race of ball bearing 118 has an annular ring 122 of L-shape in cross-section pressed onto it. Ring 122 is biased normally into abutment with cam portions 112 by means of a compression spring 124 carried by shaft 116 and disposed between back plate 96 and the adjacent snap ring 120.

The operation of governor 52 is such that rotation of shaft 90 tends to pivot weights 108 radially outwardly about pivots 110 so that cam portions 112 tend to force annular ring 122 and shaft 116 toward the right, as shown in FIG. 2, against the bias of spring 124. It should be mentioned that while it is desired to lock the driving and driven members of torque converter 10 together when they approach the same speed, it may be necessary for governor 52 to sense only the speed of the driven member. This is true, e.g., when the engine driving the torque converter runs at a relatively constant governed speed. Such is assumed to be the case for purposes of the present description.

It will be noted that weights 108, ring 122 and the rest of the rotating parts of governor 52, except portions of the shafts, are disposed in a chamber 126 defined by housing 88 and back plate 96. Chamber 126 is partially filled with a suitable fluid lubricant, such as lightweight oil, so that most of the rotating parts of the governor are bathed with lubricant, whereby wear on the rotating parts of the governor is substantially reduced.

Valve 54 includes a body 128 and a cap member 130, body 128 and cap member 130 being connected to governor 52 by means of long shanked machine screws 132 which threadably engage back plate 96. Body 128 has a longitudinal extending bore 134 therein which extends between opposite ends of the valve body. Three longitudinally spaced apart annular grooves 136, 138 and 140 are cut in the wall of bore 134. Grooves 136 and 140 are connected by means of a cross passage 142 which actually is out of the plane of the section of FIG. 2, but is rotated out of position in order to show it better. Inlet port 56 communicates with groove 138 while return port 60 and motor port 64 communicate with bore 134 and are disposed between grooves 138 and 140 and 138 and 136, respectively.

Slidably disposed in bore 134 is a valve spool 144. Spool 144 includes a necked down portion 146 and three annular longitudinally spaced apart lands 148, 150 and 152. It will be noted that in the position shown in FIG. 2 that the edges of land 150 overlap groove 138 so that communication between inlet port 56 and bore 134 is closed off. Further, lands 148 and 152 are disposed relative to grooves 136 and 140, respectively, in the position shown in FIG. 2 so that ports 60 and 64 are in communication via cross passage 142. Also, the timing of the grooves and lands is such that when spool 144 is shifted toward the right, communication between port 64 and groove 136 is closed off by land 148 at approximately the same time that communication is opened between groove 138 and port 64 as land 150 slides away, whereby pressurized fluid is supplied to clutch 22 through line 66.

Cap member 130 has a bore 154 extending longitudinally therethrough and includes a counterbored portion 156. Disposed adjacent one end of counterbored portion 156 and held between valve body 128 and cap member 130 is an annular seal retainer ring 158. Located between ring 158 and the bottom of counterbore 156 is a centering spring assembly which includes a pair of annular washers 160 through which necked down portion 146 of spool 144 extends and a helical compression spring 162 is disposed between washers 160 and normally holds them in abutment with ring 158 and the bottom of counterbore 156. Also, a retainer ring 164 is connected to the end of necked down portion 146 by means of a machine screw 166.

The outer end of cap member 130 is closed by means of a closure member 168 which threadably engages cap 130. A compression spring 170 of lighter weight than spring 162 is disposed between ring 164 and closure member 168. The closure member 168 is provided with a pair of holes 172 which are adapted to receive a spanner wrench so that closure member 168 can be threaded into or out of cap member 130, thereby adjusting the bias of spring 170. By adjusting the bias of spring 170, the amount of force required by governor 52 to shift spool 144 to the left to engage clutch 22 may be varied. Thus, the speed of turbine member 16 at which clutch 22 engages may be varied.

Also, a fluid passage 174 is provided through cap member 130 at the location shown and is adapted to be connected to conduit 78.

Referring now to FIG. 3, the details of override control valve 68 will be explained in detail. Valve 68 includes a body member 176 to which a cap member 178 is connected by means of machine screws 180. Located in body 176 is a longitudinally extending bore 180 which has three longitudinally spaced apart annular grooves 182, 184 and 186 in the wall thereof. Annular groove 182 and 186 are connected by means of a cross passage 188 which is shown rotated out of position in the sectional view. Inlet port 70 connects with annular groove 184. Ports 72 and 76 communicate with bore 180, with return port 72 being located between annular grooves 182 and 184 and port 76 being located between annular grooves 184 and 186. Slidably disposed in bore 180 is a spool 190 having a necked down portion 192 and three longitudinally spaced apart lands 194, 196 and 198. The timing of the lands and grooves is the same as for valve 54, so reference is made to the description for valve 54 at this point.

Cap member 178 has a bore 200 with a counterbored portion 202 therein. A seal retainer ring 204 is disposed adjacent one end of counterbore 202 and is held between body 176 and cap member 178. A pair of washers 206 are located at opposite ends of counterbore 202 and held in abutment with ring 204 and the bottom of counterbore 202 by means of a compression spring 208. Connected to necked down portion 192 of spool 190 by means of an outwardly extending rod 210 is an annular plate 212. Washers 206 and spring 208, together with ring 204 and plate 212 function as a centering spring assembly which serves to maintain spool 190 in the centered position shown, and to return it thereto from a displaced position.

The outer end of rod 210 abuts the arcuate edge 214 of cam 84 which contains a plurality of notches 216 therein. The notches 216 are arranged so that when the end of rod 210 registers with one of them, the gear transmission is in a selected speed ratio.

Extending through a slot 218 in cap member 178 is an L-shaped lever 220 which is pivotally connected to cap member 178 at 222, as shown. Lever 220 serves, when actuated to the dotted outline position, to maintain spool 190 in a leftward shifted position so that inlet port 70 is connected to port 76. This provides a means for rendering the control system inoperative, as will be more fully understood from the description of operation of the entire system.

Referring to FIG. 4, another embodiment of the override control valve is shown. This embodiment is substantially the same as the one shown in FIG. 3, except that lever 220 is omitted, and a conduit 224 is connected at one end to conduit 46 and at the other end to a port 226 which communicates with bore 200 in cap member 178. A three-way valve 228 is disposed in conduit 224 and serves to connect port 226 with conduit 46 or with reservoir 42 by means of a conduit 230. It will be apparent that actuating valve 228 so that pressurized fluid from conduit 46 is supplied to the chamber defined by bore 200 serves to shift spool 190 to the left, whereby inlet port 70 is placed in communication with port 76.

I will now explain the operation of my invention.

It will be assumed that the subject invention is incorporated in a vehicle which is moving forwardly in the second speed ratio, as indicated by the fact that the end of rod 210 engages the second notch 216 on cam 84, and further it will be assumed that the speed of driven member 16 of torque converter 10 is high enough so that weights 108 of governor 52 have pivoted outwardly sufficiently to cause rod 116 to move far enough, through the action of cams 112 to shift spool 144 of valve 54 to communicate pressurized fluid to clutch 22 so that it is engaged, thereby locking driving member 12 and driven member 16 together. When valve 54 is actuated as just described, fluid supply from pump 40 to inlet port 56 via conduits 46 and 58 is communicated to port 64. From port 64 the fluid is communicated to clutch 22 behind piston 32 via conduit 66. Now, if the vehicle operator wishes to shift into the third speed ratio he will manipulate lever 86 to a position in which rod 210 will engage the third notch 216 from the top of cam 84. As cam 84 is rotated in a clockwise direction in the course of shifting from second to third speed ratio rod 210 is forced out of the notch which it presently engages up onto the arcuate edge 214 of cam 84. When this occurs valve 68 is actuated to the left so that pressurized fluid from pump 40 is directed via conduit 78 into the right hand end of valve 54 where it acts to apply force to spool 144 to shift it to the position shown in FIG. 2. Spool 144 is prevented from shifting further to the left by governor 52. With valve 54 in the position shown in FIG. 2, piston 32 of clutch 22 is connected to reservoir 42 with the result that clutch 22 is disengaged. With clutch 22 disengaged the only connection between driving member 12 and driven member 16 is through the fluid in the torque converter whereby any shocks due to shifting the gear transmission may be absorbed. As the shift of the gear transmission from the second to the third speed ratio is completed the rod 210 registers with the third notch 216 from the top of cam 84. This permits spool 190 of valve 68 to shift back to the position shown in FIG. 3. When this occurs the fluid pressure on the right hand end of spool 144 of valve 54 is relieved because conduit 78 is connected to reservoir 42. With the fluid pressure on the end of spool 144 relieved, the governor 52 will cause the spool to shift back toward the right so that pressure fluid is again communicated to piston 32 via port 64 and conduit 66 as just explained hereinabove, thus re-engaging clutch 22. It will be noted that orifice 80 restricts the fluid flow in conduit 78 from valve 54 to reservoir 42 so that clutch 22 will not be re-engaged immediately following completion of the shift in the gear transmission.

In the operation of the vehicle, if it is desired to maintain the clutch 22 disengaged at all times, it is merely necessary to actuate lever 220 (FIG. 3) to hold spool 190 in a leftward shifted position. In the case of the embodiment of valve 68 shown in FIG. 4, it is necessary merely to actuate valve 228 so that pressurized fluid is supplied to the right end of valve 68 to shift spool 190 to the left.

The above detailed description is intended to be illustrative only, and should not be construed as limiting the scope of my invention because many modifications and changes to my invention will occur to those skilled in the art, without departing from the spirit of it. For example, the control system may control two clutches for locking up two separate torque converters. Such an arrangement is especially useful in an articulated vehicle which employs two complete and separate power trains which must be controlled simultaneously. Consequently, the limits of my invention should be determined from the following appended claims when viewed in light of the prior art.

I claim:

1. For use with a fluid power transmission having a driving member, a driven member and a fluid operated clutch for connecting the driving and driven members together for conjoint rotation, a source of pressurized fluid and a fluid reservoir, a control system comprising first valve means connected to the source of pressurized fluid, the reservoir and the clutch and operative to place the clutch in fluid communication with the source of pressurized fluid or the reservoir, a governor connected to the driven member and the said first valve means and operative to actuate the said first valve means to place the clutch in fluid communication with the source of pressurized fluid when the driven member reaches a predetermined speed, fluid operated means connected to the said first valve means for overriding the action of the said governor and actuating the said first valve means to place the clutch in fluid communication with the reservoir, and second valve means connected to the source of pressurized fluid, the reservoir and the said overriding means and operative to place the said overriding means in fluid communication with the source of pressurized fluid or the reservoir.

2. A control system as set forth in claim 1 and including means connected to said second valve means for maintaining said second valve means actuated to place the said overriding means in fluid communication with the source of pressurized fluid.

3. A control system as set forth in claim 1 and including orifice means for restricting fluid flow from the said overriding means to the reservoir.

4. For use with a fluid power transmission having a driving member and a driven member, a combination of a fluid clutch operable to connect the driving and driven members together, a fluid reservoir, a fluid pump connected to the said reservoir to draw fluid therefrom and pressurize it, a clutch control valve connected to the said pump, reservoir and clutch, the said valve being operative to place the said clutch in fluid communication with either the said pump or the said reservoir, a governor connected to the said valve and operative to actuate the said valve to place the said clutch in fluid communication with the said pump when the relative speeds of the driving and driven members approach a predetermined relation, and means for overriding the action of the said governor.

5. For use with a fluid power transmission having a driving member, a driven member and a fluid operated clutch for connecting the driving and driven members together for conjoint rotation, a source of pressurized fluid and a fluid reservoir, a control system comprising valve means connected to the source of pressurized fluid, the reservoir and the clutch and operative to place the clutch in fluid communication with either the source of pressurized fluid or the reservoir, a governor connected to the said valve means and operative to actuate the said valve means to place the clutch in fluid communication with the source of pressurized fluid when the relative speeds of the driving and driven members approach a predetermined ratio, and means for overriding the action of the said governor.

6. For use with a hydrodynamic torque converter having a driving member and a driven member, the combination of a fluid operated clutch connected to the torque converter and operable to connect the driving and driven members together for conjoint rotation, a fluid reservoir, a fluid pump connected to the said reservoir to draw fluid therefrom and pressurize it, a clutch control valve connected to the said pump, reservoir and clutch, the said valve being operative to place the said clutch either in fluid communication with the said pump or the said reservoir, a governor connected to the driven member and the said valve and operative to actuate the said valve to place the said clutch in fluid communication with the said pump when the driven member reaches a predetermined speed, fluid operated means connected to the said valve for overriding the action of the said governor and actuating the said valve to place the said clutch in fluid communication with the said reservoir, an override control valve connected to the said pump, reservoir and override means, the said override control valve means being operative to place the said overriding means in fluid communication with either the said pump or the said reservoir, means connected to the said override control valve for maintaining the said override control valve actuated to place the said overriding means in fluid communication with the said pump, and means for restricting fluid flow from the said overriding means to the said reservoir, said restricting means including an orifice between the said overriding means and the said reservoir and a one-way check valve connected to by-pass the said orifice and permit substantially unrestricted fluid flow from the said pump to the said overriding means.

References Cited by the Examiner
UNITED STATES PATENTS
3,058,373  10/1962  Snoy et al. _____ 192—3.2 X DAVID J. WILLIAMOWSKY, *Primary Examiner.*
DON A. WAITE, *Examiner.*
A. T. McKEON, *Assistant Examiner.*